United States Patent

Harris

(10) Patent No.: US 8,114,287 B2
(45) Date of Patent: Feb. 14, 2012

(54) SURFACE PURVEYED FILTRATION DEVICE

(75) Inventor: James Jeffrey Harris, Cameron Park, CA (US)

(73) Assignee: Layne Christensen Company, Mission Woods, KS (US)

( * ) Notice: Subject to any disclaimer, the term of this patent is extended or adjusted under 35 U.S.C. 154(b) by 954 days.

(21) Appl. No.: 12/115,361

(22) Filed: May 5, 2008

(65) Prior Publication Data

US 2008/0272068 A1    Nov. 6, 2008

Related U.S. Application Data

(60) Provisional application No. 60/916,176, filed on May 4, 2007.

(51) Int. Cl.
*B01D 25/00* (2006.01)
(52) U.S. Cl. ......... 210/317; 210/337; 210/343; 210/456
(58) Field of Classification Search .................. 210/317, 210/337, 343, 456
See application file for complete search history.

(56) References Cited

U.S. PATENT DOCUMENTS

| | | | |
|---|---|---|---|
| 1,642,864 A | 9/1927 | Williams | |
| 1,906,391 A | 5/1933 | McKinley | |
| 1,926,557 A * | 9/1933 | Perkins | 210/357 |
| 2,422,735 A | 6/1947 | La Guardia | |
| 2,455,486 A | 12/1948 | Hicks | |
| 2,495,095 A | 1/1950 | Ewbank | |
| 2,702,637 A | 2/1955 | Shepard | |
| 2,847,126 A | 8/1958 | Goodman | |
| 3,195,730 A * | 7/1965 | Muller | 210/488 |
| 3,536,200 A | 10/1970 | Gigliotti et al. | |
| 3,647,084 A | 3/1972 | Martin | |
| 3,648,843 A | 3/1972 | Pearson | |
| 4,120,794 A | 10/1978 | Taylor | |
| 4,267,045 A | 5/1981 | Hoof | |
| 4,410,430 A | 10/1983 | Hagler, Jr. | |
| 4,592,839 A | 6/1986 | Rosenberg | |
| 4,726,900 A | 2/1988 | Keskinen et al. | |
| 4,740,302 A | 4/1988 | Rosenberg | |
| 4,744,901 A | 5/1988 | Drori | |
| 4,844,806 A | 7/1989 | Drori | |
| 4,871,457 A | 10/1989 | Drori | |
| 4,880,537 A * | 11/1989 | Drori | 210/323.1 |
| 4,935,126 A | 6/1990 | Drori | |
| 5,098,565 A | 3/1992 | Drori | |
| 5,186,825 A | 2/1993 | Drori | |
| 5,393,423 A | 2/1995 | Drori | |
| 5,545,321 A | 8/1996 | Drori | |
| 6,419,826 B1 | 7/2002 | Lara et al. | |

* cited by examiner

Primary Examiner — Chester Barry
(74) Attorney, Agent, or Firm — Husch Blackwell LLP (57) ABSTRACT

A filtration appliance comprised of two types of convening disks, whereon opposing, contacting surfaces are textured or channeled, purveying passage and filtration of fluids traversing between the convening disks. A plurality of parallel, spiraling grooves on both sides of conveyance disks purvey channeling for fluid ingress and egress, inlet grooves spiral radially inward from the outside circumference, decreasing in width until terminating prior to the inside circumference, outlet grooves spiral radially outward from the inside circumference, decreasing in width until terminating prior to the outside circumference. Topologic disks conveying homogeneously textured surfaces for filtration sandwich conveyance disks. The textured topologic surface is pressed upon the conveyance surface between the grooves. Pressured dirty fluid ingresses the appliance via the conveyance disk inlet grooves, passes across the textured surface of the topologic disk surface, depositing residue thereon and egresses as clean fluid via the conveyance disk outlet grooves.

11 Claims, 7 Drawing Sheets

SURFACE PURVEYED FILTRATION DEVICE

CROSS-REFERENCE TO RELATED APPLICATIONS

This non-provisional application claims priority based upon prior U.S. Provisional Patent Application Ser. No. 60/916,176 filed May 4, 2007 in the name of James Jeffrey Harris, entitled "An Independent Surface Purveyed Filtration Process," the disclosure of which is incorporated herein by reference.

BACKGROUND OF THE INVENTION

The present invention relates generally to filtration, and more particularly to high quality, fine grade filtration. The prior art has attempted to achieve high quality, fine grade filtration in several fashions but has failed to adequately address problems with filter size, flushing, and plugging. Filter size problems have been primarily addressed through geometrical means such as stacking or packing tightly. Flushing problems have been addressed by the employment of chemicals, recycle flushing, high energy pumping, and pneumatically-aided flushing. Attempts to resolve plugging impediments have included chemical-enhanced flushing, chemical soaking, and manual cleaning. Such current designs, while sometimes effective, leave room for improvement in the areas of filter size, flushing, and plugging. In particular, the prior art remains challenged by: filter sizes that are larger than desired, flush volumes that are larger than desired, and the proclivity of plugging and associated filtration blockage.

BRIEF SUMMARY OF THE INVENTION

A filtration device and process are provided that facilitate a high quality, fine grade filtration without being burdened by the filter size, flushing, or plugging impediments inherent in the prior art. The filtration device is comprised of a topologic disk with a vacant circular center and a textured surface, and a conveyance disk with a vacant circular center and a grooved surface containing multiple inlet grooves and multiple outlet grooves. Each of the inlet grooves begins at an inlet point on the outer circumference of the conveyance disk, curves along the grooved surface, and terminates at an endpoint prior to the inner circumference of the conveyance disk. Similarly, each of the outlet grooves begins at an outlet point on the inner circumference of the conveyance disk, curves along the grooved surface, and terminates at an endpoint prior to the outer circumference of the conveyance disk. In addition, the textured surface of the topological disk and the grooved surface of the conveyance disk may be brought into direct contact with one another for filtration and separated from one another for flushing. The textured surface of the topological disk may also feature a homogeneous and grainy finish and the inlet grooves and outlet grooves may be of equal length. In one embodiment, the inlet grooves and the outlet grooves are configured in a spiral array. The spiral array may be configured so that the inlet grooves and the outlet grooves a repositioned in an alternating order such that each of the inlet grooves is directly adjacent to two outlet grooves and each of the outlet grooves is directly adjacent to two inlet grooves. Also, the portion of each of the outlet grooves that is directly adjacent to one of the two inlet grooves may be offset from the portion of each of the outlet grooves that is directly adjacent to the other of the two inlet grooves. Each of the inlet grooves and each of said outlet grooves may be spaced equidistant apart on the grooved surface of the conveyance disk. Additionally, the width of each of the inlet grooves may decease from the inlet point of each of the inlet grooves to the endpoint of each of the inlet grooves, the width of each of the outlet grooves may increase from the endpoint of each of the outlet grooves to the outlet point of each of the outlet grooves, and the rate of the decrease of the width of the inlet grooves may be inversely proportional to the rate of the increase in the width of the outlet grooves. Furthermore, multiple sets of the topological disk and conveyance disk can be stacked together in an alternating order to increase filtration capacity. In this arrangement, the top surface and the bottom surface of the topologic disks in the interior of the stack are textured and the top surface and bottom surface of the conveyance disks in the interior of the stack are grooved. Finally, at least one of the textured surface of the topological disk and the grooved surface of the conveyance disk may be rotated relative to the other before the surfaces of the two disks come together for filtration.

The process for surface purvey filtration comprising the steps of: connecting the textured surface of a topological disk with the grooved surface of a conveyance disk; pressuring one or more fluids that contain solids into the inlet grooves of said conveyance disk, across portions of the contact area of said textured surface and said grooved surface, and out of outlet grooves of said conveyance disk, to collect said solids on said textured surface; separating said textured surface of said topological disk from said grooved surface of said conveyance disk; flushing said textured surface of said topological disk from said grooved surface of said conveyance disk to remove said collected solids; rotating at least one of said textured surface of said topological disk and said grooved surface of said conveyance disk relative to one another; and performing the above steps in repeated cycles.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. The present invention will be described with respect to preferred embodiments in a specific context, namely as a device and process for high quality, fine grade filtration. The invention may also be applied, however, to other situations where filtration is desirable.

Figure 1:
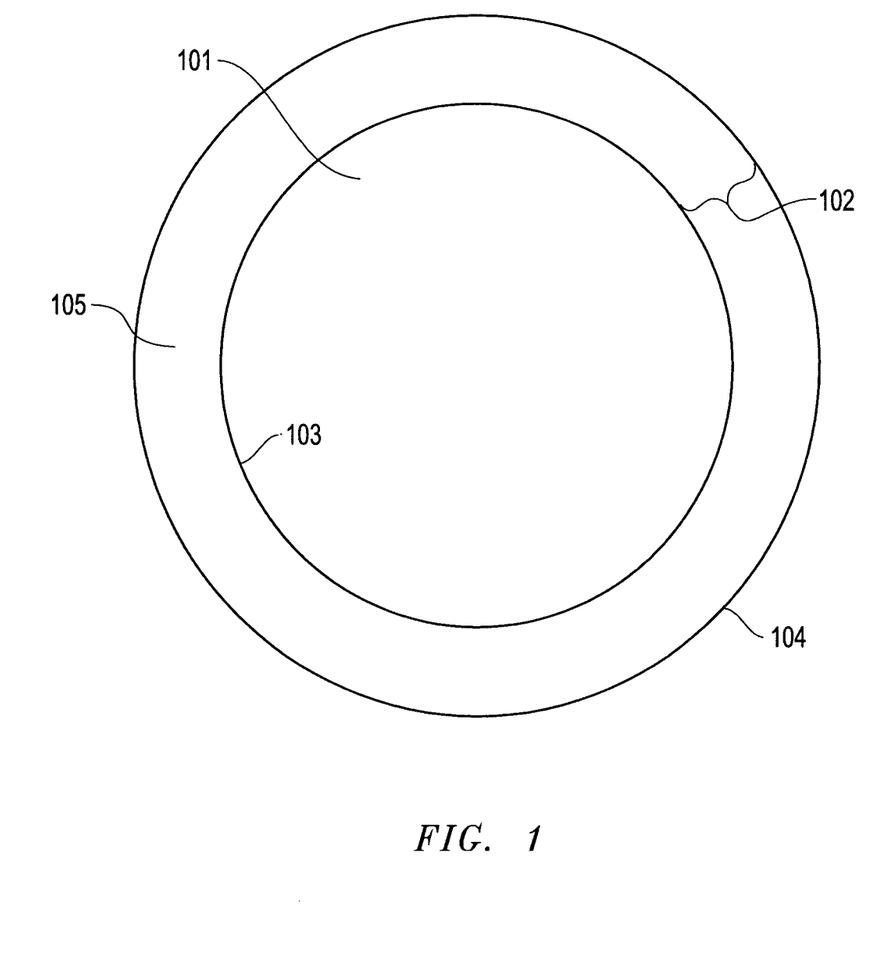
FIG. 1 is a top view of a topologic disk of the present invention.

With reference now to FIG. 1, a top view of a topologic disk of the present invention is shown. The topological disk has a vacant circular center 101. The width of the topological disk 102 is defined by the inner circumference of the topological disk 103 and the outer circumference of the topological disk 104. The surface of the topologic disk 105 is generally flat but is textured. In one embodiment, the surface of the topological disk 105 is textured in a homogeneous fashion with a grainy, sandpaper-like finish. The texture of the surface of the topological disk 105 can be varied to optimize the grade of filtration.

Figure 2:
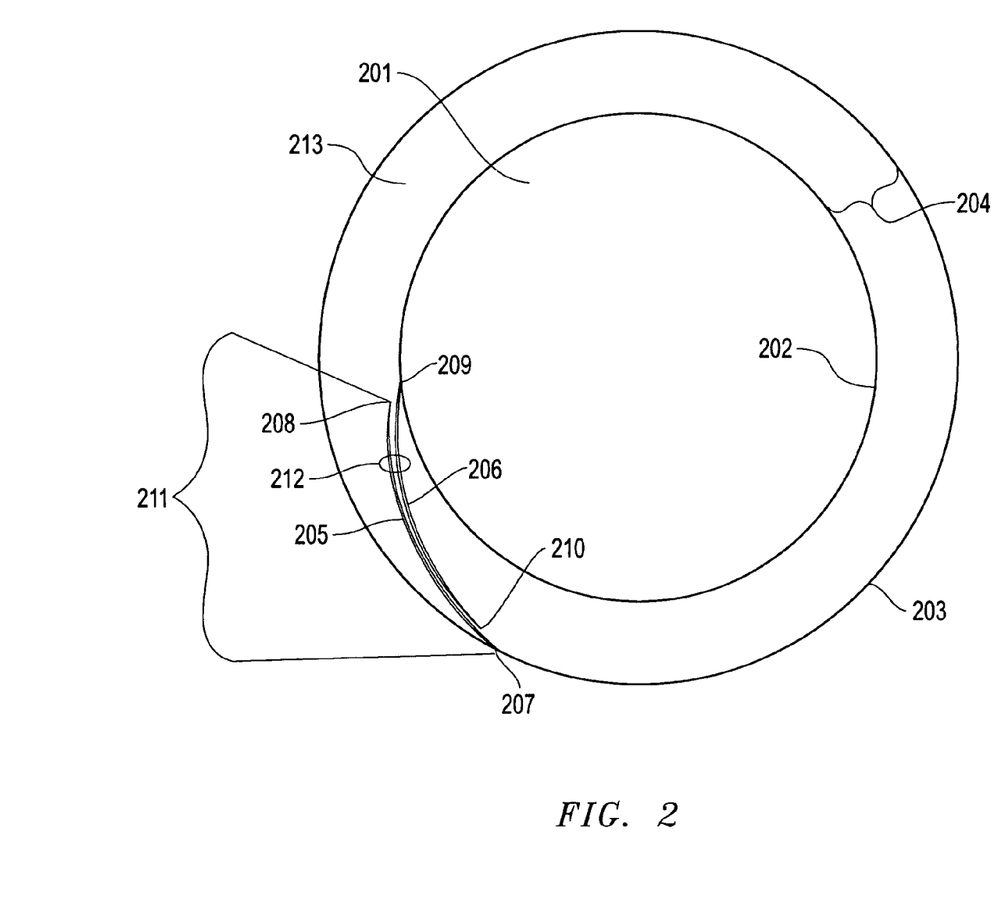
FIG. 2 is a top view of a conveyance disk of the present invention illustrating an inlet groove and outlet groove.

With reference now to FIG. 2, a top view of a conveyance disk of the present invention illustrating an inlet groove and outlet groove is shown. The conveyance disk has a vacant circular center 201. The width of the conveyance disk 204 is defined by the inner circumference of the conveyance disk 202 and the outer circumference of the conveyance disk 203. The surface of the conveyance disk 213 is generally flat but contains an inlet groove 205 and an outlet groove 206. Each groove curves inwardly upon the disk surface in as shown in FIG. 2. The inlet groove 205 begins at a point 207 on the outer circumference of the conveyance disk 203, curves inward as it extends towards the inner circumference, and terminates at a point 202 prior to the inner circumference 202. Similarly, the outlet groove begins at a point 209 on the inner circumference of the conveyance disk 202, curves inward as it extends towards the outer circumference, and terminates at a point 210 prior to the outer circumference 203. The length of the inlet groove 205 and the length of the outlet groove 206 are equal. In addition, the inlet groove 205 and the outlet groove 206 are optimally positioned so that a significant portion 211 of the inlet groove 205 is directly adjacent to a significant portion of the outlet groove 206. Also, the distance 212 between the inlet groove 205 and the outlet groove 206 is constant along the portion 211 of the grooves that are directly adjacent to one another. Finally, in one embodiment, the width of the inlet groove 205 decreases along the length of the inlet groove 205 so that the inlet groove 205 is widest at the inlet point 207 and narrowest at inlet groove's endpoint 208. At the same time, the width of the outlet groove 206 increases along its length so that the outlet groove 206 is widest at the outlet point 209 and narrowest at outlet groove's endpoint 210. Moreover, in one embodiment, the rate of decrease along the length of the inlet groove 205 is in direct proportion to the rate of increase along the length of the outlet groove 206.

Figure 3:
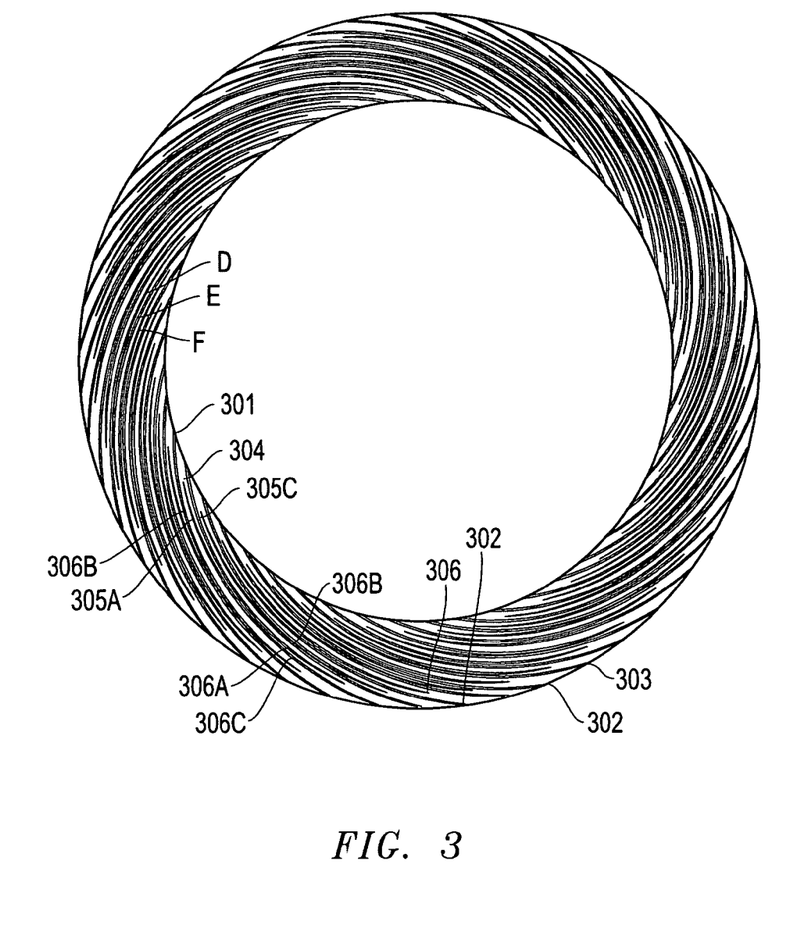
FIG. 3 is a top view of a conveyance disk of the present invention containing an array of multiple inlet and outlet grooves.

With reference now to FIG. 3, a top view of a conveyance disk of the present invention containing an array of multiple inlet and outlet grooves is shown. In this embodiment, multiple inlet and outlet grooves appear in a spiral array on the top surface of the conveyance disk. Each of the grooves on the surface of the conveyance disk has the same length. For example, the length of Outlet Groove A as measured from its inlet point 301 to its endpoint 306 is equal to the length of Inlet Groove B as measured from its inlet point 302 to its endpoint 304. In addition, all of the grooves are spaced equidistant apart. For example, the distance between point 306A and point 306B is equal to: the distance between point 306A and 306C, the distance between point 305A and point 305B, and the distance between point 305A and point 305C. The inlet and outlet grooves are also positioned in an alternating order so that each inlet groove is immediately adjacent to two outlet grooves and each outlet groove is immediately adjacent to two inlet grooves. Also, the portion of each outlet groove that is directly adjacent to an inlet groove on one side of the outlet groove is offset from the portion of that outlet groove that is directly adjacent to the inlet groove on the other side of that outlet groove. For example, Outlet Groove A is directly adjacent to Inlet Groove B from point 304A to endpoint 306A and Outlet Groove A is directly adjacent to Inlet Groove C from point 305A to endpoint 306A. As a result, Outlet Groove A is not directly adjacent to either Inlet Groove B or Inlet Groove C between points 301 and 304A and only overlaps Inlet Groove B between points 304A and 305A.

Figure 4:
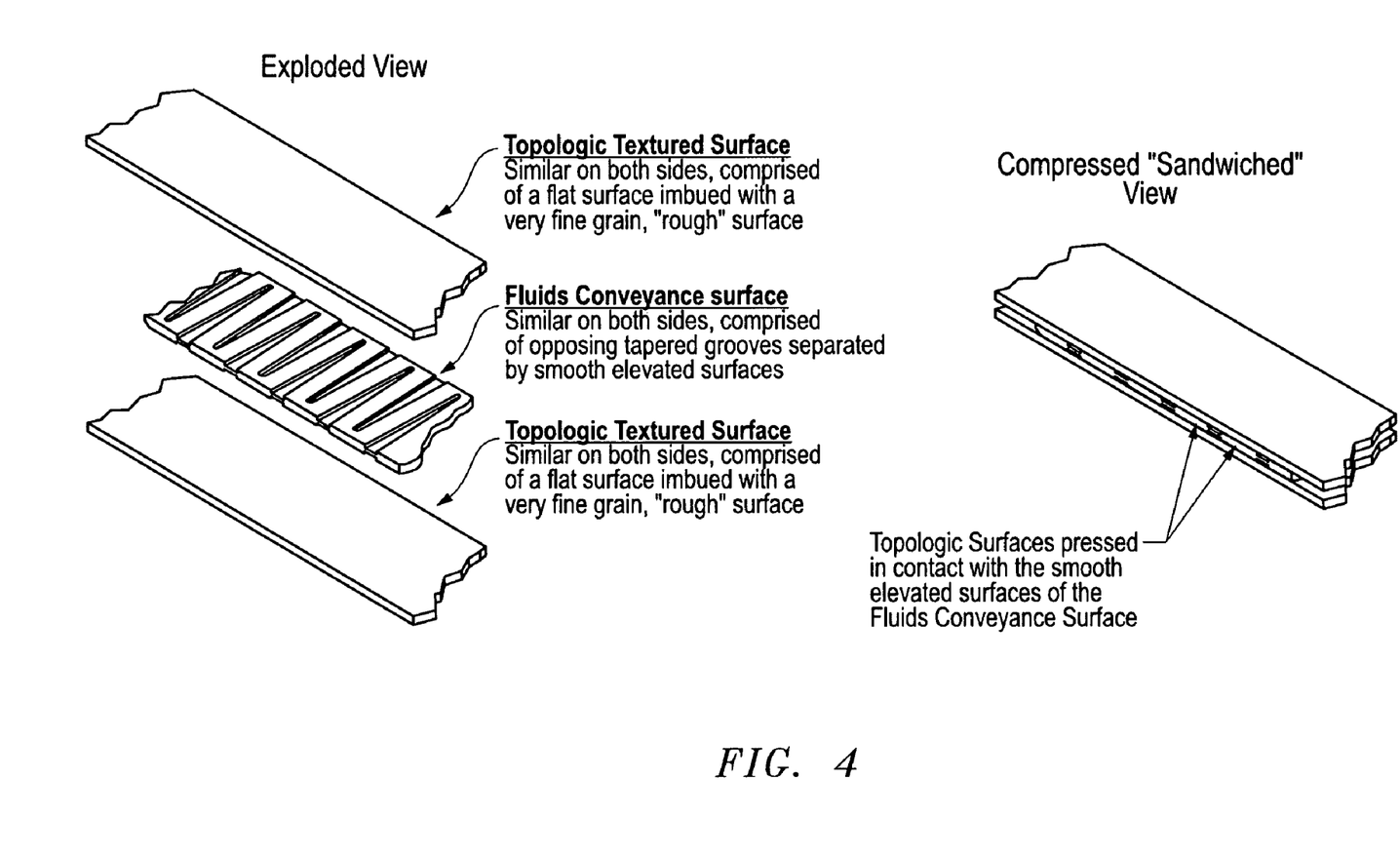
FIG. 4 is an exploded view of a topologic disk and conveyance disk of the present invention shown in contact with one another as fluid enters and exits the present invention.

With reference now to FIG. 4, an exploded view of a topologic disk and conveyance disk of the present invention shown in contact with one another as fluid enters and exits the present invention is shown. First, the textured surface of the topologic disk is brought into direct contact with the grooved surface of the conveyance disk. Second, pressured fluid is introduced to the external surface of the disks. This fluid enters the inlet grooves and begins moving towards the circular center of the disks. As the fluid travels along the inlet grooves, the fluid also begins to exit the inlet grooves on both sides of each inlet groove. Fluid exiting an inlet groove directly contacts the surface area of the topological disk that is in contact with the surface area of the conveyance disk that lies between the inlet groove and the two outlet grooves adjacent to the inlet grooves (collectively, the "Filter Area"). Because the surface of the topological disk is textured, the Filter Area creates a tortuous path for the fluid. As the fluid travels across the Filter Area, solids that are entrained within the fluid are captured upon the textured surface of the topological disk. Eventually, the fluid traveling across the Filter Area reaches and enters an outlet groove. This fluid, now free of solids, travels along the outlet groove until it exits the outlet groove and enters into the circular center of the disks.

Figure 5:
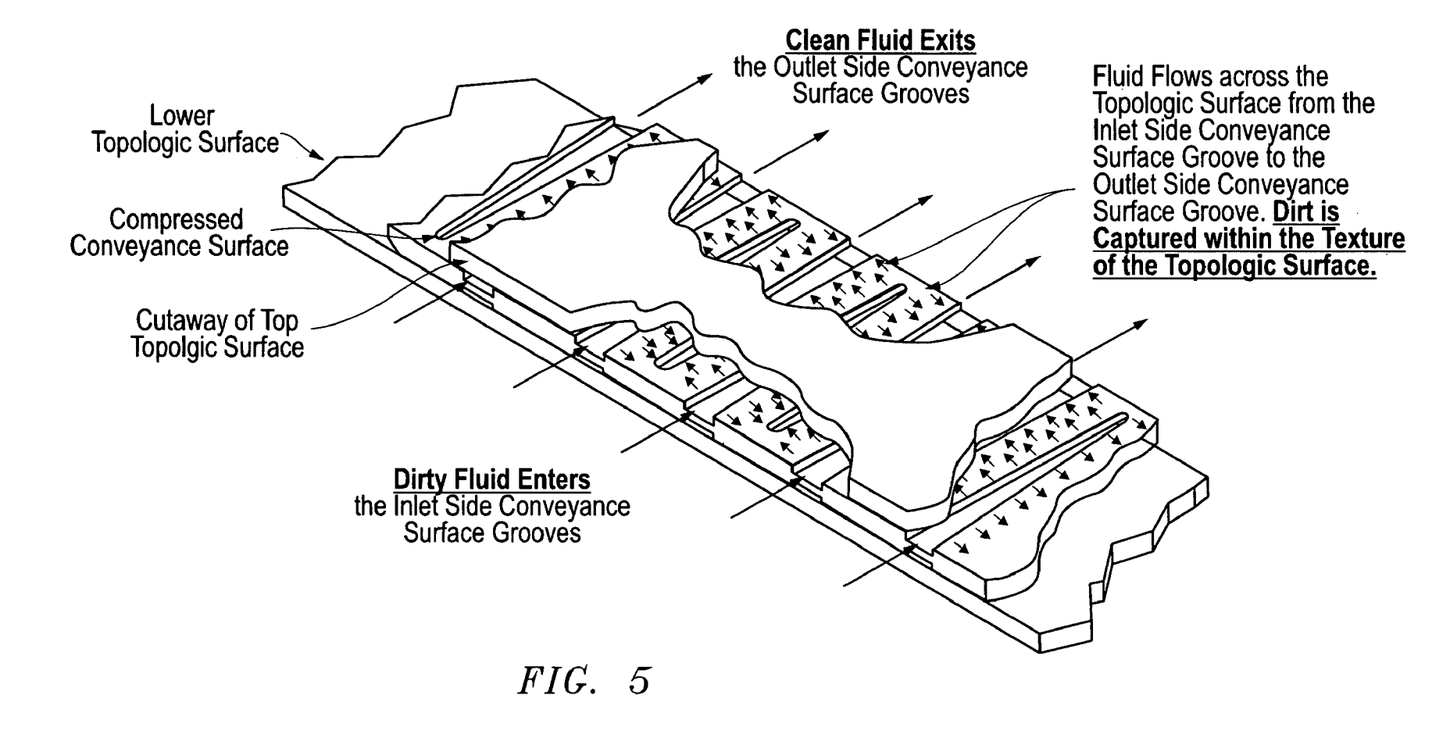
FIG. 5 is a fluid flow pattern of the present invention during filtration.

With reference now to FIG. 5, a fluid flow pattern of the present invention is shown. As fluid fills the inlet groove, the fluid begins to exit the inlet groove in both directions perpendicular to the length of the inlet groove. Accordingly, the rate of fluid flow within the inlet groove decreases along the length of the inlet groove so that the rate of flow is highest at the inlet point of the inlet groove and lowest at the endpoint of the inlet groove. In contrast, as fluid begins to accumulate in the outlet groove after having traveled across the Filter Area, the rate of fluid flow along the outlet groove increases along the length of the outlet groove so that the rate of fluid flow is lowest at the endpoint of the outlet groove and highest at the outlet point of the outlet groove. In other words, the velocity profile of fluid flowing into the inlet grooves essentially matches the velocity profile of fluid flowing out of the outlet grooves. This match of velocity profiles provides a critical balance of hydraulic pressure between the inlet and outlet grooves and is largely achieved by decreasing the width of the inlet groove along the length of the inlet groove at the same ratio that the width of the outlet groove is increased along the length of the outlet groove.

Figure 6:
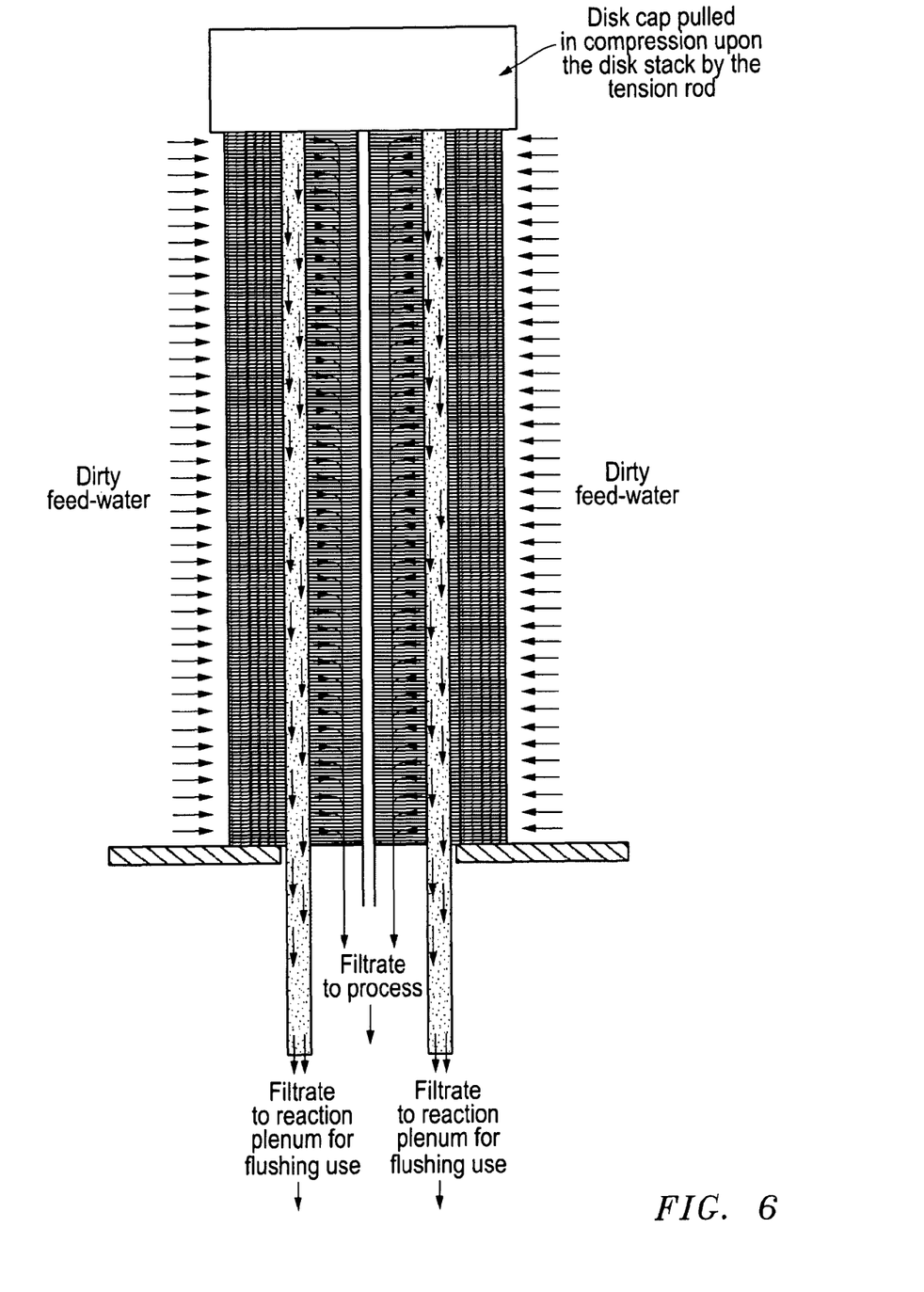
FIG. 6 is a side view of a filter stack of multiple topologic disks and conveyance disks of the present invention.

With reference now to FIG. 6, a side view of a stack of multiple topologic disks and conveyance disks of the present invention is shown. In one embodiment of the present invention, multiple disks are stacked in an order alternating between topological disks and conveyance disks. The topological disks in the interior of the stack have top and bottom surfaces that are textured. Similarly, both the top and bottom surfaces of the conveyance disks in the interior of the stack contain a plurality of inlet and outlet grooves. Accordingly, the stack comprised of alternating topologic and conveyance disks provides for increased filtration capacity. In addition, as one of ordinary skill in the art will readily recognize, the topological disks and conveyance disks can also be manufactured out of many different materials. For example, the choice of material may improve filtering ability depending on the characteristics of the fluids, including characteristics such as corrosiveness and viscosity, and solids involved in the filtration.

Figure 7:
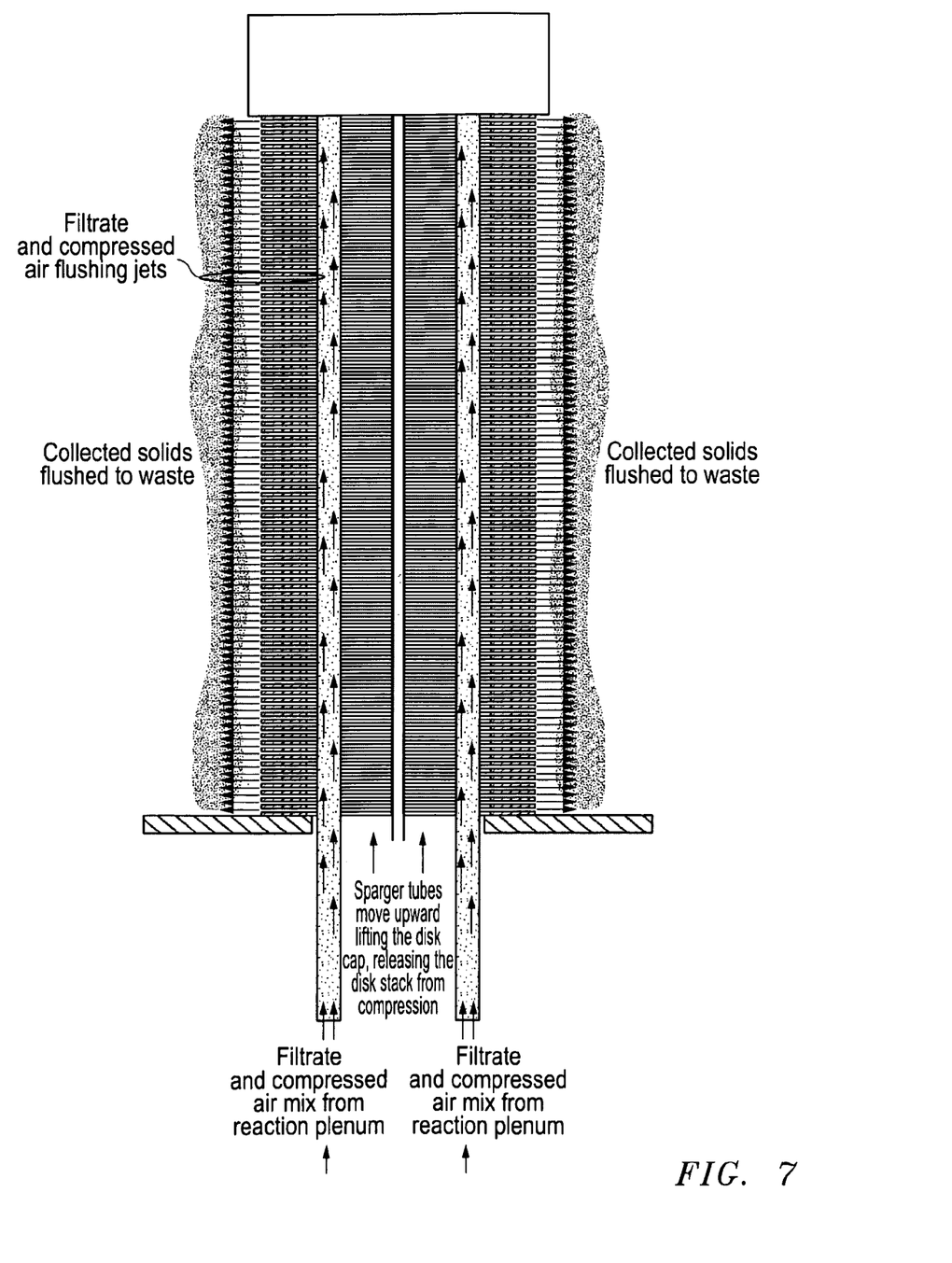
FIG. 7 is a perspective view of a conveyance disk and topological disk of the present invention shown during flushing.

With reference now to FIG. 7, a perspective view of a conveyance disk and topological disk of the present invention during flushing is shown. Eventually, the number of solids collected upon the topologic disk surface becomes so great that the filtration efficiency of the present invention is reduced. At this time, the disks are separated from one another and the surfaces of the disks are flushed with a solid-free fluid in order to remove the collected solids. During this flushing, the topological disks are rotated around their circular center so that, when the topological disks are brought back into contact with the conveyance disks, each portion of the textured surfaces of the topological disks will come into contact with a different portion of the surfaces of the conveyance disks. As a result of this rotation, the present invention will employ different portions of the surface area of the topologic disks in subsequent filtrations. In addition, the rotation allows for multiple flushes of the used portions of the textured surfaces of the topological disks prior to subsequent use. As a result, this combination of flushing and rotation enhances cleaning and minimizes plugging. After the disks have been flushed and rotated, the surfaces of the corresponding topological disks and conveyance disks are brought back into contact with one another to allow for additional filtrations.

An important and novel feature of the present invention is that the topological and conveyance disks can provide filtration irrespective of their rotational orientation. At the same time, the rotational orientation of the surfaces of the disks can be varied in order to facilitate filtration because only a small portion of the topologic disk collects solids during any given filtration. For example, changing the rotational orientation of the disks relative to one another after flushing allows for separate portions of the topological disk surface to provide filtering during subsequent filtrations. In addition, changing the rotational orientation of the disks relative to one another allows for multiple flushes of a used portion of the textured surface of a topological disk prior to subsequent filtering use. In this way, changing the rotational orientation enhances flushing efficiency, minimizes plugging and reduces flush water waste, downtime, chemical usage, and cleaning maintenance.

Another important and novel feature of the present invention is the spiral array of the inlet and the outlet grooves on the surface of the conveyance disk. The length of the inlet and outlet grooves may be increased or decreased in order to optimize the filtration of the present invention for particular combinations of fluids and solids. For example, increasing the length of the inlet and outlet grooves increases the overlapping portions of the inlet and outlet grooves, thereby increasing the portion of the topologic disk surface that is available for filtering in any given filtration. In this manner, the novel spiral arrangement of the grooves dramatically increases the rate of filtration of the present invention and the capacity of the present invention to capture solids between flushing. In addition, the novel spiral arrangement of the grooves on the surface of the conveyance disk optimizes the portion of the disk surfaces available for filtration while reducing the required physical size of the filtering surfaces.

Another important and novel feature of the present invention is that adjacent grooves on the surface of the conveyance disk are spaced equidistant apart. This equidistant spacing provides a uniform pressure drop between adjacent inlet and outlet grooves and, consequently, prevents the fluid from short-circuiting the tortuous path between the inlet and outlet grooves. Consequently, the present invention is not prone to preferential flow problems such as accelerated solids build up, premature plugging, and related flushing difficulties. As a result, the present invention provides the advantage of reducing flushing frequency, flush water waste, downtime, chemical usage, and cleaning maintenance. Moreover, the equidistant spacing of the grooves may also be increased or decreased in order to optimize the filtration of the present invention for particular combinations of fluids and solids Another important and novel feature of the invention is the balance of hydraulic pressure along the inlet and outlet grooves that is achieved by decreasing the width of the inlet grooves along the lengths of the inlet grooves and, in a directly proportional manner, increasing the width of the outlet grooves along the lengths of the outlet grooves. This balance of hydraulic pressure minimizes localized plugging, flushing volume, downtime, chemical usage, and cleaning maintenance.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. Finally, in the foregoing discussion and in the claims, the terms "including" and "comprising" are used in an open-ended fashion, and thus should be interpreted to mean "including, but not limited to . . . ".

What is claimed is:
1. A filtration device comprising:
   a. a topologic disk with a vacant circular center and a textured surface;
   b. a conveyance disk with a vacant circular center and a grooved surface containing multiple inlet grooves and multiple outlet grooves;
   c. wherein each of said inlet grooves begins at an inlet point on the outer circumference of said conveyance disk, curves along said grooved surface, and terminates at an endpoint prior to the inner circumference of said conveyance disk;
d. wherein each of said outlet grooves begins at an outlet point on the inner circumference of said conveyance disk, curves along said groove surface, and terminates at an endpoint prior to the outer circumference of said conveyance disk; and
e. wherein said textured surface of said topological disk and said grooved surface of said conveyance disk may be brought into direct contact with one another for filtration and separated from one another for flushing.

2. The device of claim 1 wherein said textured surface of said topological disk has a homogeneous and grainy finish.

3. The device of claim 1 wherein each of said inlet grooves and said outlet grooves have the same length.

4. The device of claim 1 wherein said inlet grooves and said outlet grooves are configured in a spiral array.

5. The device of claim 4 wherein said spiral array consists of said inlet grooves and said outlet grooves positioned in an alternating order such that each of said inlet grooves is directly adjacent to two outlet grooves and each of said outlet grooves is directly adjacent to two inlet grooves.

6. The device of claim 5 wherein the portion of each of said outlet grooves that is directly adjacent to one of said two inlet grooves is offset from the portion of each of said outlet grooves that is directly adjacent to the other of said two inlet grooves.

7. The device of claim 1 wherein each of said inlet grooves and each of said outlet grooves are spaced equidistant apart on said grooved surface of said conveyance disk.

8. The device of claim 1 wherein the width of each of said inlet grooves decreases from said inlet point of each of said inlet grooves to said endpoint of each of said inlet grooves, the width of each of said outlet grooves increases from said endpoint of each of said outlet grooves to said outlet point of each of said outlet grooves.

9. The device in claim 1 wherein multiple sets of said topological disk and said conveyance disk are stacked together in an alternating order, wherein the top surface and the bottom surface of said topologic disks in the interior of said stack are textured, and wherein the top surface and bottom surface of said conveyance disks in the interior of said stack are grooved.

10. The device in claim 1 wherein at least one of said textured surface of said topological disk and said grooved surface of said conveyance disk may be rotated relative to the other prior to said direct contact with one another for filtration.

11. The device of claim 8 wherein said decrease is inversely proportional to said increase.

\* \* \* \* \*